(12) United States Patent
Spaulding et al.

(10) Patent No.: US 9,452,890 B2
(45) Date of Patent: Sep. 27, 2016

(54) LINEAR WAVE MOTION CONVEYOR

(71) Applicant: Smalley Manufacturing Co., Inc., Knoxville, TN (US)

(72) Inventors: Brian D. Spaulding, Seymour, TN (US); John S. Little, Jr., Knoxville, TN (US); Edward D. Martin, Maryville, TN (US); Steven P. Hettmansburger, Maryville, TN (US)

(73) Assignee: Smalley Manufacturing Co., Inc., Knoxville, TN (US)

( * ) Notice: Subject to any disclaimer, the term of this patent is extended or adjusted under 35 U.S.C. 154(b) by 0 days.

(21) Appl. No.: 14/517,294

(22) Filed: Oct. 17, 2014

(65) Prior Publication Data

US 2016/0107841 A1   Apr. 21, 2016

(51) Int. Cl.
| | |
|---|---|
| *B65G 27/02* | (2006.01) |
| *B65G 27/24* | (2006.01) |
| *B65G 27/32* | (2006.01) |
| *B65G 37/00* | (2006.01) |
| *B65G 27/16* | (2006.01) |
| *B65G 27/04* | (2006.01) |
| *H02K 41/02* | (2006.01) |

(52) U.S. Cl.
CPC .............. *B65G 27/32* (2013.01); *B65G 27/02* (2013.01); *B65G 27/04* (2013.01); *B65G 27/16* (2013.01); *B65G 27/24* (2013.01); *B65G 37/00* (2013.01); *H02K 41/02* (2013.01)

(58) Field of Classification Search
CPC ...... B65G 27/24; B65G 27/02; B65G 21/18; B65G 2207/24

USPC .............................. 198/769, 756, 778, 750.7
See application file for complete search history.

(56) References Cited

U.S. PATENT DOCUMENTS

| | | | | |
|---|---|---|---|---|
| 2,535,050 | A | * 12/1950 | Devol | B65G 27/00 198/757 |
| 3,372,793 | A | * 3/1968 | Redford | B65G 27/00 198/761 |
| 5,272,970 | A | 12/1993 | Burke | |
| 5,351,807 | A | 10/1994 | Svejkovsky | |
| 5,699,897 | A | 12/1997 | Svejkovsky | |
| 5,794,757 | A | 8/1998 | Svejkovsky et al. | |
| 6,079,548 | A | 6/2000 | Svejkovsky et al. | |

(Continued)

FOREIGN PATENT DOCUMENTS

| | | |
|---|---|---|
| AU | 199519971 | 10/1995 |
| AU | 200023647 | 8/2000 |

(Continued)

*Primary Examiner* — Mark A Deuble
(74) *Attorney, Agent, or Firm* — Pitts & Lake, P.C.

(57) ABSTRACT

A linear wave motion conveyor is disclosed. A pan defines a conveying surface and a conveying direction. A linear drive mechanism is provided having an elongated thrust bar extending parallel to the conveying direction and a stator portion configured to drive the thrust bar in relation to said stator portion along the conveying direction. A base supporting the linear drive mechanism and the pan is provided. The thrust bar is fixed in relation to one of the base or the pan and the stator portion is fixed in relation to the other of the base or the pan. A controller is in operative communication with the stator portion to control driving of the thrust bar in relation to the stator portion. The controller is configured to cause the stator to drive the thrust bar in conformity with a cyclic pattern of motion along the conveying direction.

24 Claims, 11 Drawing Sheets

(56) References Cited

U.S. PATENT DOCUMENTS

| | | | |
|---|---|---|---|
| 6,119,849 A | 9/2000 | Svejkovsky et al. | |
| 6,193,050 B1 | 2/2001 | Svejkovsky et al. | |
| 6,286,665 B1 | 9/2001 | Svejkovsky et al. | |
| 6,308,821 B1* | 10/2001 | Asai | F15B 15/082 198/750.7 |
| 6,378,688 B1 | 4/2002 | Fitzgerald et al. | |
| 6,398,013 B1 | 6/2002 | Svejkovsky et al. | |
| 6,827,201 B1* | 12/2004 | Markowski | B65G 27/20 198/753 |
| 6,899,218 B2* | 5/2005 | Kwasniewicz | B65G 27/12 198/750.1 |
| 7,345,670 B2 | 3/2008 | Armstrong | |
| 7,770,847 B1 | 8/2010 | Severson | |
| 7,798,890 B2 | 9/2010 | Gerrits et al. | |
| 8,066,114 B2 | 11/2011 | Svejkovsky et al. | |
| 8,070,108 B2 | 12/2011 | Severson | |
| 8,542,678 B2 | 9/2013 | Buckley | |
| 8,561,788 B2 | 10/2013 | Knodell, Jr. et al. | |
| 2002/0022072 A1 | 2/2002 | Burke et al. | |
| 2005/0115807 A1* | 6/2005 | Kostel | B65G 27/24 198/769 |
| 2006/0171091 A1 | 8/2006 | Seale et al. | |
| 2007/0017784 A1* | 1/2007 | Giovinazzo | B65G 27/24 198/755 |
| 2009/0266679 A1* | 10/2009 | Miner | B65G 25/06 198/617 |
| 2012/0016542 A1 | 1/2012 | Severson | |

FOREIGN PATENT DOCUMENTS

| | | |
|---|---|---|
| AU | 2001283137 | 2/2002 |
| AU | 200235605 | 10/2002 |
| AU | 2005234730 | 12/2005 |
| AU | 2011238514 | 10/2011 |
| CA | 2242971 | 3/1997 |
| CA | 259338 | 6/2000 |
| CA | 2354615 | 6/2001 |
| CA | 2418343 | 2/2002 |
| CA | 2383839 | 10/2002 |
| CA | 2185348 | 8/2005 |
| CA | 2795300 | 10/2011 |
| CA | 2846593 | 2/2013 |
| EP | 0925241 | 12/2004 |
| EP | 1505013 | 2/2005 |
| EP | 1714922 | 10/2006 |
| EP | 1159211 | 11/2006 |
| GB | 2375092 | 11/2002 |
| GB | 2383937 | 9/2004 |
| JP | 2002338036 | 4/2001 |
| MX | 2012011437 | 10/2012 |
| WO | WO995025687 | 9/1995 |
| WO | WO0035787 | 6/2000 |
| WO | WO0048930 | 8/2000 |
| WO | WO02/13621 | 2/2002 |
| WO | WO2011/126987 | 10/2011 |
| WO | WO2013/028891 | 2/2013 |

* cited by examiner

LINEAR WAVE MOTION CONVEYOR

BACKGROUND

1. Field of Invention

The present general inventive concept relates to feeders and conveyors, and more particularly, to a linear motion conveyor useful in conveying bulk materials.

2. Description of the Related Art

Various types of conveyors and feeders (hereinafter, collectively, "conveyors") are known for use in conveying bulk materials. In a typical conveyor, force may be applied to, for example, bulk materials in one or more directions in order to move materials from one location to another. For example, in a linear conveyor, force may be applied to bulk materials in order to move the materials along a linear direction. Linear conveyors are often employed, for example, to move bulk materials adjacent or through other machinery or workers which may be employed in a fabrication or packaging process.

Two common types of linear conveyors are belt conveyors and pan conveyors. In a belt conveyor, two or more pulleys are provided with an endless loop of flexible material surrounding them. The endless loop forms a carrying surface, and the pulleys are rotated to move a top portion of the carrying surface from one pulley toward the other. A pan conveyor typically employs a solid conveying surface, known as a "pan," which is turned up on the sides to form a trough shape. The pan is typically set at a slight angle to the horizontal and is subjected to motion, such as vibration or oscillating motion, in order to move the materials along the pan, often with the assistance of gravitational forces acting on the materials.

In some instances, pan conveyors may be preferred over belt conveyors or other types of conveyors where sanitation is a concern, such as in the food or pharmaceutical industries, due to the relative ease in cleaning the pan of a pan conveyor as compared to the conveying surfaces of other types of conveyors. Furthermore, a discharge end of a pan conveyor may be formed to define a beveled, or "biased," shape, such that the biased pan conveyor may discharge bulk materials in a relatively even layer along a subsequent linear conveyor. Thus, pan conveyors are often preferred where two or more conveyors are required to merge at angles, and where it is desired to spread product evenly over the width of the subsequent conveyor.

Notwithstanding the above, the use of pan conveyors to convey certain types of bulk materials may pose significant limitations. For example, a pan conveyor which employs vibration of the pan to convey material may subject the material to significant impact forces due to the vibratory action of the conveyor, and can therefore result in damage to the conveyed material. Thus, in circumstances in which breakage of product is a concern, such as for example when fragile food products, such as potato chips, flake cereal, etc., are being conveyed, vibratory pan conveyors are typically less desirable. A pan conveyor which employs linear oscillation of the pan along the direction of travel to convey material is dependent upon an alternating sliding and frictional relationship between the conveying surface of the pan and the material to be conveyed, such that a forward action of the pan urges material in a forward direction along the conveyor, while a backward action of the pan allows the pan to slide beneath the forward-moving material with minimal interruption of the forward movement of the conveyed material. This type of "adhere-slide" relationship can be difficult to establish, thus requiring significant startup time for this type of conveyor. Furthermore, the "adhere-slide" relationship of the pan and materials to be conveyed is often dependent upon the specific weight and frictional characteristics of the materials to be conveyed, thus requiring fine-tuning of the pan conveyor in order to effectively convey the bulk materials.

The use of linear actuators driven by electric motors with programmable stroke lengths has been previously explored as a solution for some of the aforementioned limitations. Linear actuators consist of two elements which can be made to move relative to each other along a single axis. When one element is mounted to a fixed surface, the other element can be set into motion and a thrust force is produced in line with the moving element. If motion is induced dictated by a cyclic profile featuring a high-thrust reverse motion followed by a low-thrust forward motion, the linear actuator can be used as a horizontal motion drive. However, linear actuator designs present unique challenges of their own. Mechanical mounting arrangements can introduce unwanted vertical force vectors and limit stroke length. Thrust rod designs based on either rotary-driven screws or annular linear motors typically require close-tolerance machining and robust guiding to avoid destructive axial loading. Flat linear motor designs require even more exacting machining, owing to the precise air gap that must be maintained between the motor coils and the permanent magnets along the axis of travel.

In light of the above, a linear conveyor which addresses some or all of the afore-mentioned limitations is desirable.

BRIEF SUMMARY

Various embodiments of the present general inventive concept may be accomplished by providing a linear wave motion conveyor which having a pan defining a conveying surface, a leading end, an opposite discharge end, and a conveying direction extending from the leading end to the discharge end. A linear drive mechanism may be provided having an elongated thrust bar extending parallel to the conveying direction and a stator portion configured to drive the thrust bar in relation to the stator portion along the conveying direction. A base may support the linear drive mechanism and the pan, and the thrust bar may be fixed in relation to one of the base or the pan. The stator portion may be fixed in relation to the other of the base or the pan. A controller may be provided in operative communication with the stator portion to control driving of the thrust bar in relation to the stator portion. The controller may be configured to cause the stator to drive the thrust bar in conformity with a cyclic pattern of motion along the conveying direction. The conveying direction can be forward, reverse, inclined, circular, or combinations thereof.

Various example embodiments constructed in accordance with the present general inventive concept may provide a linear wave motion conveyor in which the thrust bar is fixed to the pan and the stator portion is fixed to the base. In some embodiments, the thrust bar may carry and support the pan. In some embodiments, the stator portion may comprise a linear motor which is configured to apply electromagnetic induction forces to the thrust bar. The thrust bar may be sufficiently long to allow the stator portion to drive the thrust bar in conformance with the cyclic pattern of motion along separate upstream and downstream portions of the thrust bar, thereby allowing the discharge end of the pan to be repositionable among at least two discharge locations.

In various embodiments, the controller may comprise a sensor configured to sense a positional or movement characteristic of the thrust bar in relation to the stator portion, an input module configured to receive a plurality of command data relating to a desired cyclic pattern of motion, and a command module in communication with the sensor and the input module. The command module may be configured to receive an indication of the characteristic sensed by the sensor, to compare the characteristic with the command data, and to issue an output command to the stator portion to drive the thrust bar in substantial conformity with the command data.

In some embodiments, the linear wave motion conveyor may further comprise a display device configured to display at least one of a graphical representation of a desired cyclic motion of the pan and a graphical representation of an actual motion of the pan. In some embodiments, the plurality of command data may comprise a plurality of phases, each phase relating to a portion of a single cycle of the cyclic pattern of motion. In certain embodiments, each phase of command data may comprise a speed datum corresponding to a desired speed of the thrust bar during the phase, a maximum acceleration datum corresponding to a maximum allowable acceleration of the thrust bar during the phase, a maximum deceleration datum corresponding to a maximum allowable deceleration of the thrust bar during the phase, and a distance datum corresponding to a length of the thrust bar over which the phase is applied. In such embodiments, a duration of each the phase may be governed at least in part by the speed datum and the distance datum.

In various embodiments, the command module may be configured to command the stator portion according to a sequential progression of each of the phases of command data. The input module may be configured with a signal generator to provide a plurality of command signal data relating to a plurality of cycles of motion, an example of which is illustrated in FIG. 8. The command module may be configured to command the stator portion according to a sequential progression of each of the plurality of cycles of motion.

Additional embodiments of the present general inventive concept may be accomplished by providing a method of moving goods with a linear wave motion conveyor. In various embodiment, the method may comprise providing a conveyor having an elongated pan carried and driven along an elongated dimension of the pan by a linear thruster. A sensor may be provided and configured to sense at least one characteristic of the pan, the characteristic being selected from the group consisting of position, speed, and acceleration, a command module in communication with the sensor. An input module may be provided in communication with the command module. The method may further comprise the operation of programming a plurality of command data relating to a desired cyclic pattern of motion of the pan into the input module, and conveying sensory data from the sensor to the command module and command data from the input module to the command module. The method may further comprise the operation of producing an output command to selectively actuate the linear thruster in substantial conformity with the command data.

In some embodiments, the plurality of command data may comprise a plurality of phases, each phase relating to a portion of a single cycle of the desired cyclic pattern of motion. In some embodiments, each phase of command data may comprise a speed datum corresponding to a desired speed of the pan, a maximum acceleration datum corresponding to a maximum allowable acceleration of the pan, a maximum deceleration datum corresponding to a maximum allowable deceleration of the pan, and a distance datum corresponding to a distance over which the phase is applied. In such embodiments, a duration of each phase may be governed at least in part by the speed datum and the distance datum.

In some embodiments, the output signal may comprise a series of commands to selectively actuate the linear thruster according to a sequential progression of each of the phases of command data. The programming operation may include programming a plurality of command data relating to a plurality of cycles of motion into the input module. The method output signal may comprises a series of commands to selectively actuate the linear thruster according to a sequential progression of each of the plurality of cycles of motion.

Additional aspects and advantages of the present general inventive concept will be set forth in part in the description, drawings, and claims which follow, and, in part, will be obvious from the description, or may be learned by practice of the present general inventive concept.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
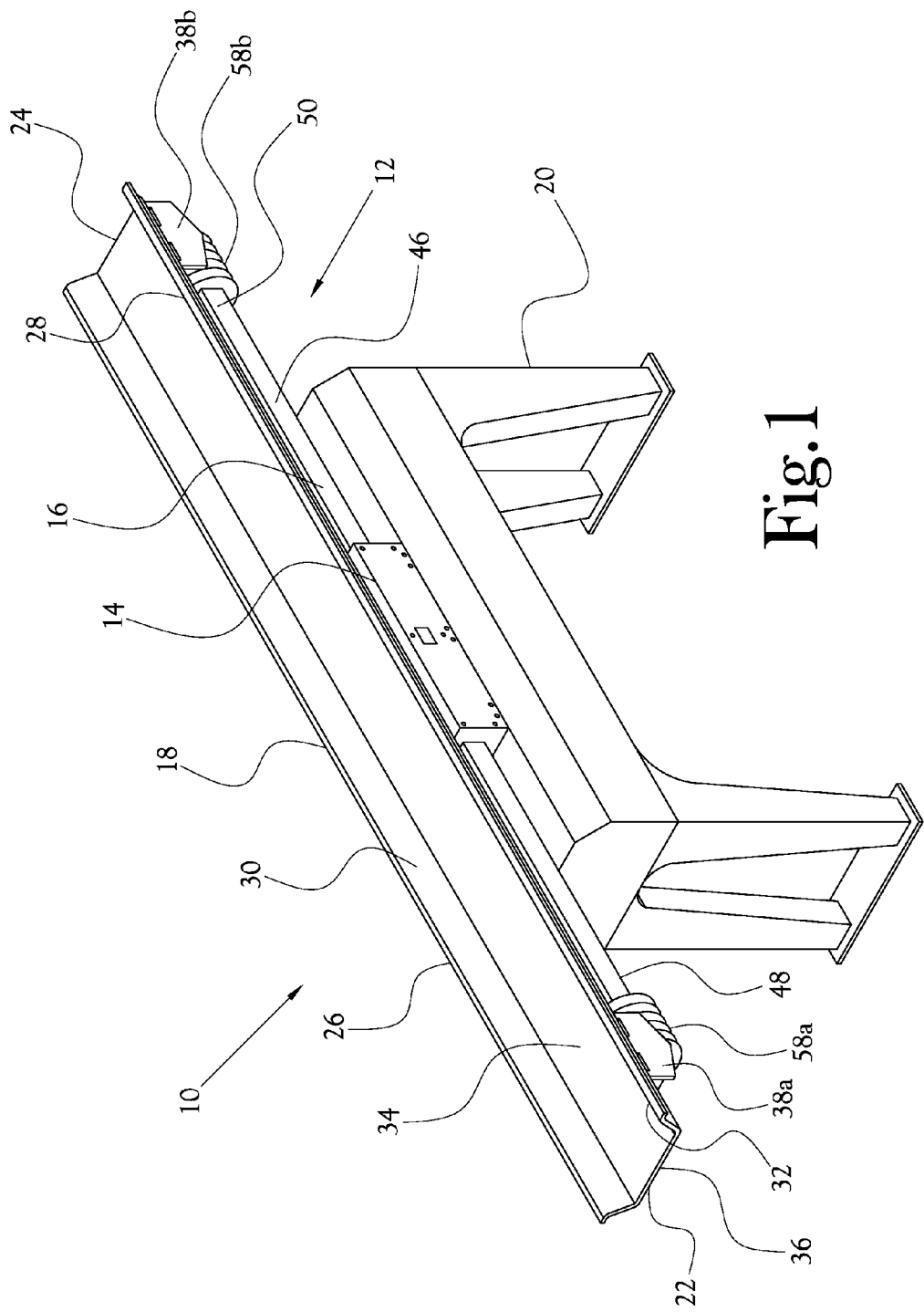
FIG. 1 is a perspective view showing one embodiment of a linear wave motion conveyor constructed in accordance with several features of the present general inventive concept.
Figure 2:
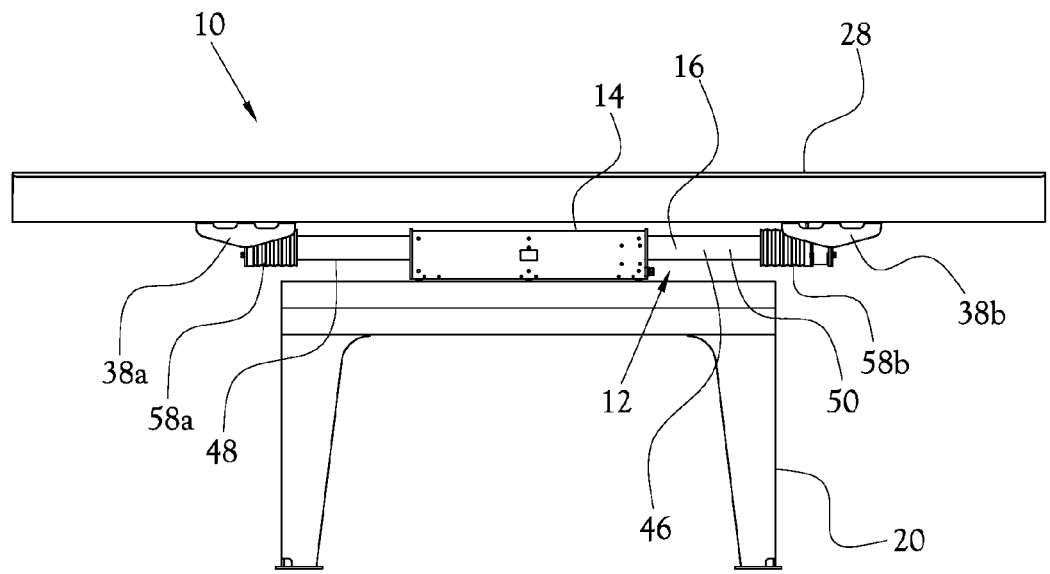
FIG. 2 is a side elevation view of the linear wave motion conveyor of FIG. 1.
Figure 3:
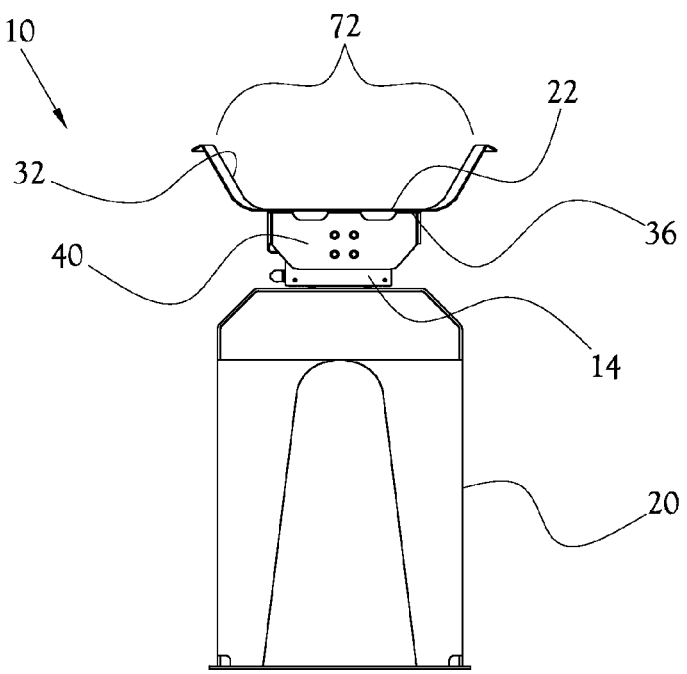
FIG. 3 is an end elevation view of the linear wave motion conveyor of FIG. 1.

According to various examples of the present general inventive concept, a linear wave motion conveyor is disclosed herein. The linear wave motion conveyor, or "conveyor," is illustrated generally at 10 in the figures. With reference to FIG. 1, the conveyor 10 includes generally a linear drive mechanism 12 having a stator portion 14 and a thrust arm portion 16. In various embodiments, one of the stator or thrust arm portions 14, 16 is coupled to an elongated pan 18, while the other of the stator or thrust arm portions is coupled to a base 20. The base 20 supports the pan 18 and linear drive mechanism 12 from a support surface, such as the floor. The linear drive mechanism 12 is configured such that the thrust arm portion 16 moves in relation to the stator portion 14 in forward and backward directions parallel to a long dimension of the pan 18. Thus, the pan 18 is moved in relation to the base 20 in forward and backward directions parallel to its long dimension. As will be discussed in further detail herein, in various example embodiments of the present general inventive concept, a controller 64 is provided in operable communication with the linear drive mechanism 12 to establish and maintain a desired cyclic pattern of forward and backward motion of the pan 18 in relation to the base 20.

With particular reference to FIGS. 1-4, in the illustrated embodiment, the pan 18 is defined by an elongated sheet of relatively smooth material, having a leading end 22, an opposite discharge end 24, and opposite first and second side edges 26, 28 spanning therebetween and extending generally along an elongated dimension of the pan 18. In the illustrated embodiment, the first and second side edges 26, 28 are turned upward from the remainder of the pan 18, such that first and second side walls 30, 32 are formed along the first and second side edges 26, 28 of the pan 18, approximately parallel with the elongated dimension of the pan 18. In various embodiments, the pan 18 is fabricated from a food-grade material of the type commonly used in the handling of food products, such as for example food-grade polymer plastic, stainless steel, aluminum, etc. For example, in the illustrated embodiment, the pan 18 is fabricated from a polished stainless steel material.

Figure 5:
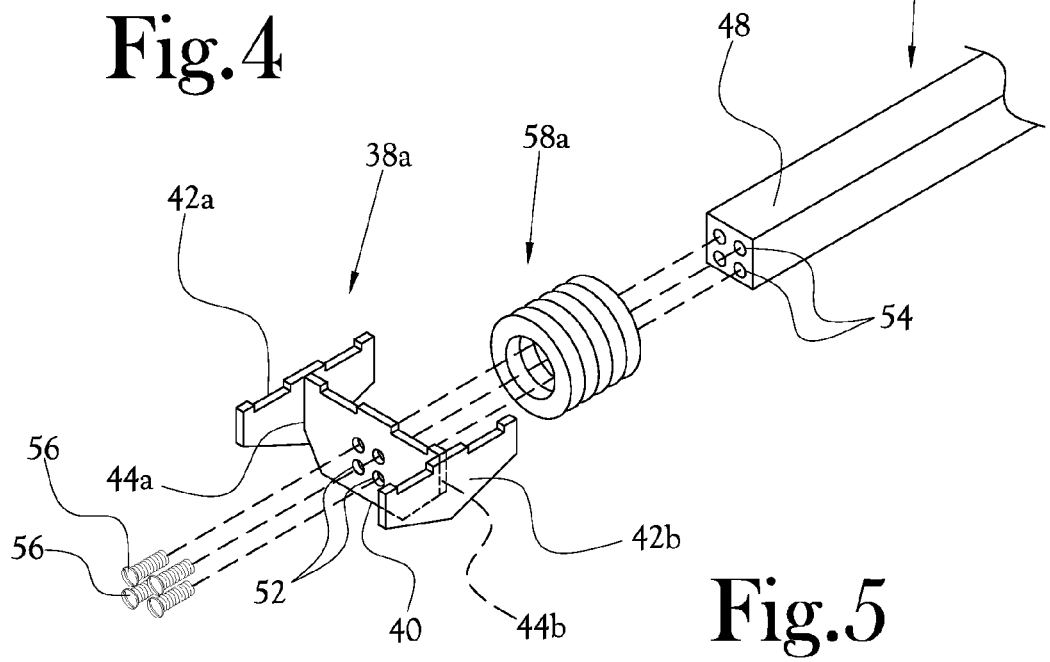
FIG. 5 is a partially-exploded partial perspective view of one end of the thrust arm portion of the linear wave motion conveyor of FIG. 1.

The pan 18 defines generally an upward-facing first major surface 34 which serves as a conveying surface for the conveyor 10, and an opposite, downward-facing second major surface 36. In the illustrated embodiment, a pair of brackets 38a, 38b, are mounted to the second major surface 36 along a centerline of the pan 18 parallel to the elongated dimension of the pan 18, with a first bracket 38a being disposed toward the leading end 22 of the pan 18, and a second bracket 38b being disposed toward the discharge end 24 of the pan 18. As best shown in FIG. 5, each bracket 38a, 38b defines a substantially planar member 40 extending generally downwardly from the pan 18, perpendicular to both the second major surface 36 and the elongated dimension of the pan 18. In the illustrated embodiment, a pair of side walls 42a, 42b are joined at each of opposite side edges 44a, 44b of each bracket 38a, 38b and extend generally perpendicular to the planar members 40. Each side wall 42a, 42b is joined, as by a weld, adhesive, mechanical fastener, or suitable connection, to the second major surface 36 of the pan 18. However, it will be recognized by one of skill in the art that other shapes may be embodied by the brackets 38a, 38b, and such brackets may be joined along the second major surface 36 by other means, without departing from the spirit and scope of the present general inventive concept.

In several embodiments, the thrust arm portion 16 includes a thrust bar 46 extending between the brackets 38a, 38b, parallel to the elongated dimension of the pan 18. In the illustrated embodiment, the thrust bar 46 is comprised of an elongated, substantially rigid cylindrical member having a first end 48 secured to the first bracket 38a and an opposite second end 50 secured to the second bracket 38b. More specifically, in the illustrated embodiment, each of the planar members 40 of each of the brackets 38a, 38b defines a plurality of through bores 52 extending substantially perpendicularly thereto. Corresponding bores 54 are defined along the first and second ends 48, 50 of the thrust bar 46 and extend axially inward along the elongated dimension of the thrust bar 46. Each pair of corresponding bores 52, 54 is configured to receive therein a fastener 56, such as a pin, screw, nut and bolt assembly, or the like, such that the fasteners 56 cooperate to secure the thrust bar 46 in a position spanning between the planar members 40 of each of the brackets 38a, 38b. In various embodiments, the connections between the first and second ends 48, 50 of the thrust bar 46 and respective brackets 38a, 38b are adjustable, such that the position of the thrust bar 46 in relation to the pan 18 may be adjusted to establish and maintain the elongated dimension of the pan 18 parallel with the elongated dimension of the thrust bar 46. In other embodiments, the first and second ends 48, 50 of the thrust bar 46 may be secured to respective brackets 38a, 38b via a non-adjustable connection, such as for example an adhesive, weld, or integral connection.

As noted above, a stator portion 14 of the linear drive mechanism 12 is provided to drive the thrust bar 46 along a length thereof. More specifically, the stator portion 14 includes a motor which is configured to engage the thrust bar 46 and to drive the thrust bar 46 in relation to the stator portion 14 in forward and backward directions along the length of the thrust bar 46. In various embodiments, the stator portion 14 may include one or more rollers, gears, or the like, which are configured to mechanically engage and drive the thrust bar 46. However, in several embodiments, the stator portion 14 includes an inductive linear motor which is configured to apply electromagnetic induction forces to the thrust bar 46, thereby driving the thrust bar 46 along a drive direction of the linear motor. In such embodiments, the thrust bar 46 and the stator portion 14 cooperate to form a linear thruster.

It will be recognized that the above-described embodiments in which the thrust bar 46 and stator portion 14 comprise a linear thruster offer several unique advantages over the prior art. For example, the above-described linear motor of the stator portion 14 eliminates the need for rotary-to-linear motion conversion components, such as couplings, gear boxes, belts, pulleys and other motion conversion mechanisms commonly associated with most conveyors, thereby saving energy by avoiding frictional losses attributed to these components. Therefore, the above-discussed linear thruster helps to improve reliability of the conveyor 10 and makes maintenance easier by reducing the number of wear items as compared to conventional conveyors. In several embodiments, the linear thruster is a high-speed linear actuator with an integrated linear guide that is capable of pushing, pulling and/or carrying a load. Thus, the linear thruster combines high velocity, which in some embodiments may be up to five meters per second, high levels of acceleration, and peak thrust forces. In some embodiments, the linear thruster is capable of achieving between approximately 168 and approximately 4,305 Newtons of thrust.

In the illustrated embodiment, a pair of dampers (not shown) are provided, with one damper being disposed within each of the opposite ends 48, 50 of the thrust bar 46. The dampers are configured to serve as stops for the thrust bar 46, thereby preventing the stator portion 14 from moving beyond either of the opposite ends 48, 50 of the thrust bar 46 and directly impacting the brackets 38a, 38b. In several embodiments, the dampers are comprised of a spring and/or a resilient material, such as for example rubber, foam, or the like, which is mounted within a respective end 48, 50 of the thrust bar 46. Thus, in several embodiments, the dampers serve to dampen impact of the brackets 38a, 38b against the stator portion 14 as each of the respective ends 48, 50 of the thrust bar 46 travel toward the stator portion 14.

In the illustrated embodiment, a pair of boots 58a, 58b are provided, with each boot being disposed at one of the opposite ends 48, 50 of the thrust bar 46. The boots 58a, 58b are configured to encircle and substantially surround an interface of each respective end 48, 50 of the thrust bar 46 with a corresponding bracket 38a, 38b in order to shield the interface from accumulation of particulates, debris, or the like. In various embodiments, each of the boots 58a, 58b comprises a sleeve of flexible, substantially air impermeable material, such as for example rubber, polymer, or the like. However, it will be recognized that other materials and configurations exist which are suitable to accomplish the boots 58a, 58b, and such other materials and configurations may be used without departing from the spirit and scope of the present general inventive concept. Furthermore, it will be recognized that inclusion of the boots 58a, 58b, while desirable in various applications, is not necessary to accomplish the conveyor 10 pursuant to the present general inventive concept.

Figure 4:
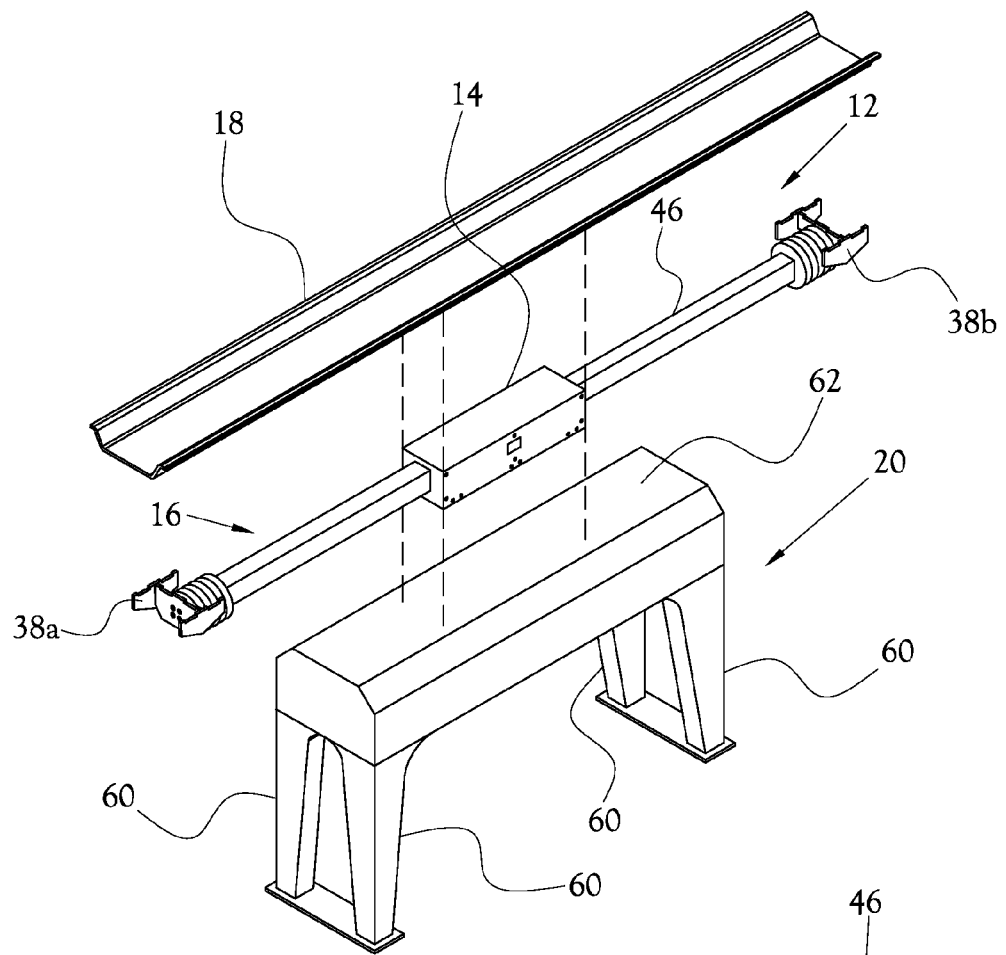
FIG. 4 is a partially-exploded perspective view of the linear wave motion conveyor of FIG. 1.

As indicated above, and with reference to FIG. 4, a base 20 is provided to carry and support the linear drive mechanism 12 and the pan 18 from a support structure, such as the floor or ground. In various embodiments, the base 20 comprises generally a framed structure having at least one leg 60, and in several embodiments a plurality of legs 60, and at least one upper support member 62. In the illustrated embodiment, the stator portion 14 of the linear drive mechanism 12 is fixed to the upper support member 62, such that the base 20 holds the stator portion 14 in a stationary position while the stator portion 14 drives the thrust bar 46 and associated pan 18 in forward and backward directions along the long dimensions of the pan 18 and thrust bar 46. However, it will be understood that other configurations of the linear drive mechanism 12 are possible and may be employed without departing from the spirit and scope of the present general inventive concept. For example, in various other embodiments, the linear drive mechanism 12 is inverted, such that the stator portion 14 is fixed to the downward-facing second major surface 36 of the pan 18, while the brackets 38a, 38b and associated thrust bar 46 are fixed in relation to the upper support member 62 of the base 20. In these embodiments, the stator portion 14 is secured to the pan 18 such that a driving direction of the stator portion 14 is substantially parallel with the elongated dimension of the pan 18. Thus, in these embodiments, the stator portion 14 carries and drives the pan 18 in forward and backward directions along the length of the thrust bar 46, parallel to the long dimension of the pan 18.

Figure 6:
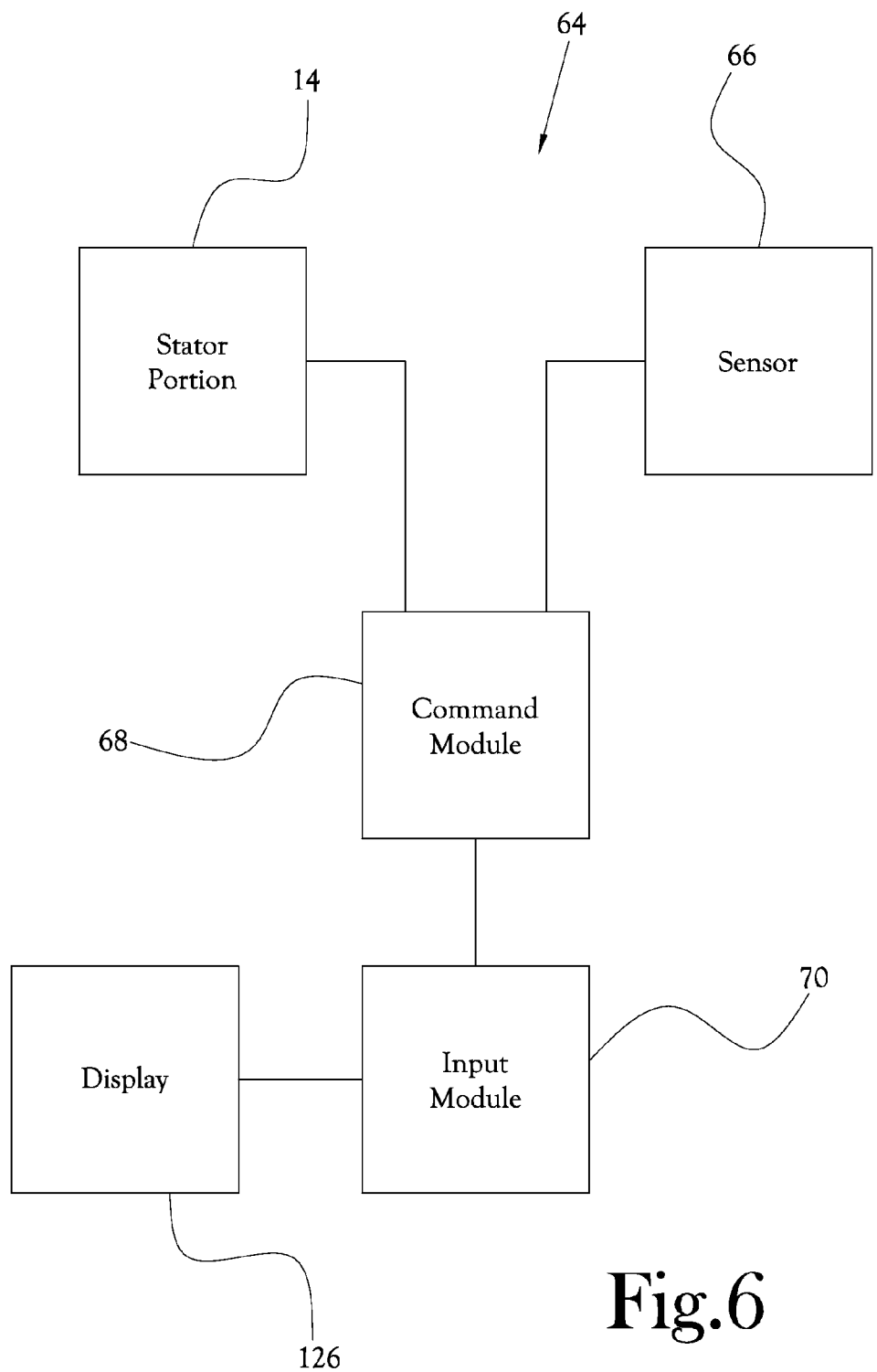
FIG. 6 is a schematic diagram of one embodiment of a controller for a linear wave motion conveyor constructed in accordance with several features of the present general inventive concept.
Figure 7:
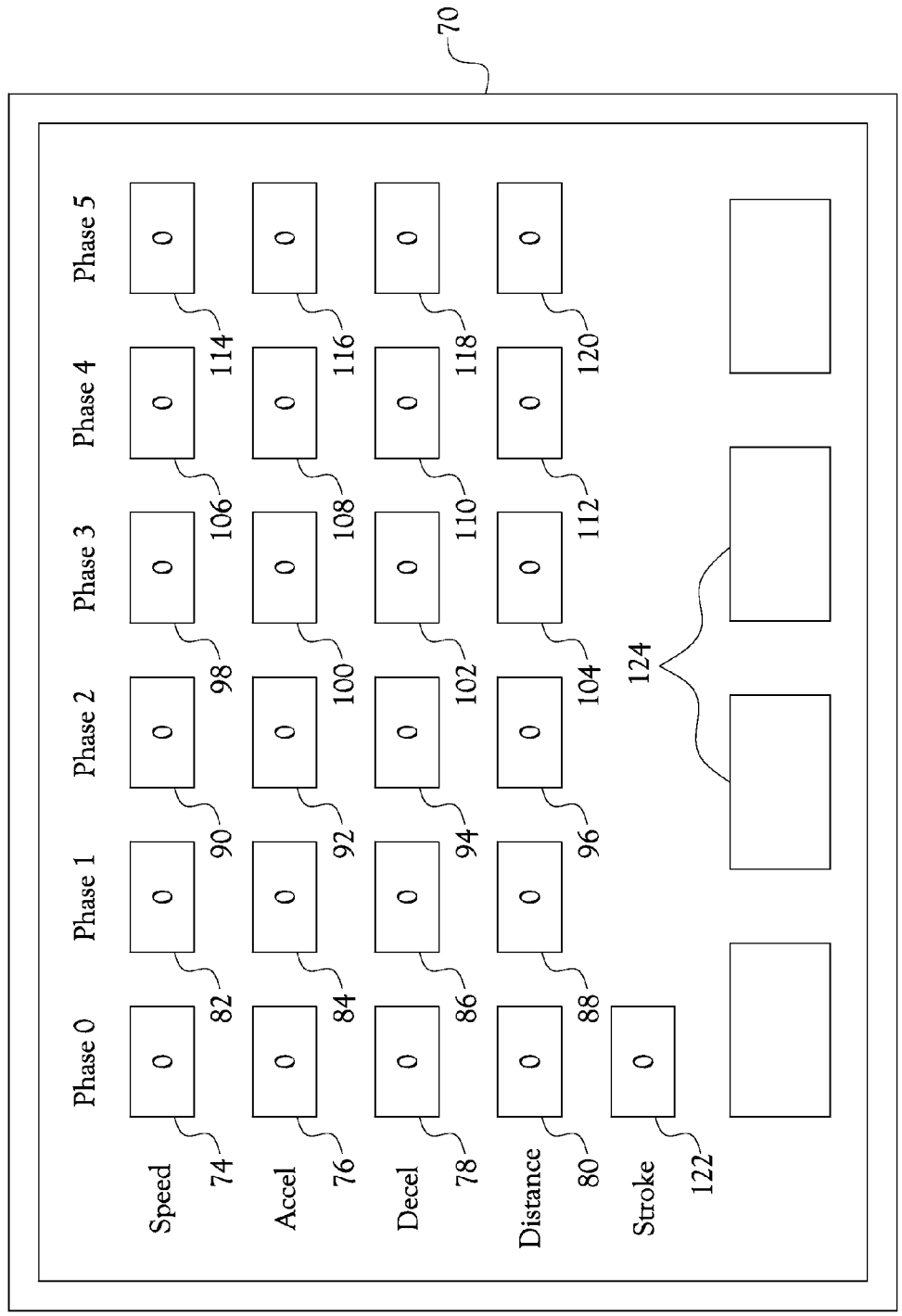
FIG. 7 is a depiction of one embodiment of an input module for a linear wave motion conveyor constructed in accordance with several features of the present general inventive concept.

Referring now to FIGS. 6 and 7, and as noted above, a controller 64 is provided in operable communication with the linear drive mechanism 12 to establish and maintain a desired cyclic pattern of forward and backward motion of the pan 18 in relation to the base 20. More specifically, in various embodiments, at least one sensor 66 is provided within, or proximate to, the stator portion 14 of the linear drive mechanism 12 to sense movement and/or positional conditions of the thrust bar 46 and to provide sensory data regarding conditions of the thrust bar 46 in relation to the stator portion 14. For example, in one embodiment, a plurality of sensors 66 are provided to sense the position, speed, acceleration rate, deceleration rate, and force of movement of the thrust bar 46 in relation to the stator portion 14. The various sensors 66 are in communication with a command module 68, such that the command module 68 may receive indications from each of the various sensors 66 regarding the above-discussed monitored conditions of the thrust bar 46. The command module 68 is further in communication with an input module 70, the input module 70 being configured to receive a plurality of command data, such as for example a desired elapsed time and desired position of the thrust bar 46, and/or a desired speed, acceleration and/or deceleration rate, force of motion, distance of motion, or other such desired motion, for the thrust bar 46. The command module 68 is capable of receiving the command data from the input module 70, performing a comparison of the received command data to the sensory data received from the various sensors 66, and producing an output command in response to differences between the sensory and command data. The command module 68 is in operative communication with the stator portion 14 of the linear drive mechanism 12 such that the output command causes the stator portion 14 to increase or decrease driving force acting on the thrust bar 46, such that the thrust bar 46 is driven in general conformity with the command data.

In various embodiments, the input module 70 can be configured with a signal generator to generate command signals instructing the conveyer to move in one or more desired cyclic patterns of forward and backward motion of the pan 18 in relation to the base 20, such that repetition of the motion cycles results in continuous, or near continuous, motion of conveyed material along the first major surface 34 of the pan 18. For example, in several embodiments, the desired cyclic pattern comprises repetition of a single cycle of motion characterized by rapid motion of the pan 18 toward the leading end 22 of the pan 18, followed by relatively slower motion of the pan 18 toward the discharge end 24 of the pan 18. In several embodiments, the desired cyclic pattern includes repetition of a cycle of motion which includes initially slow, but progressively accelerated, forward motion of the pan 18 toward the discharge end 24 of the pan 18, followed by rapid reverse motion of the pan 18 toward the leading end 22 of the pan 18. In various embodiments, the forward motion of the pan 18 toward its discharge end 24 is, at least throughout a portion of the forward motion, of one or more velocities sufficient to allow the pan to frictionally engage at least a portion of the material situated on the first major surface 34 of the pan 18 and to urge the engaged material toward the discharge end 24. The relatively more rapid motion of the pan 18 toward its leading end 22 is of sufficient velocity as to, when combined with the forward motion of the material on the first major surface 34 of the pan 18, allow for frictional slippage of the material in relation to the first major surface 34, thereby allowing the pan 18 to return toward its leading end 22 with minimal slowing or reversing of the forward progress of the material along the first major surface 34.

Figure 9:
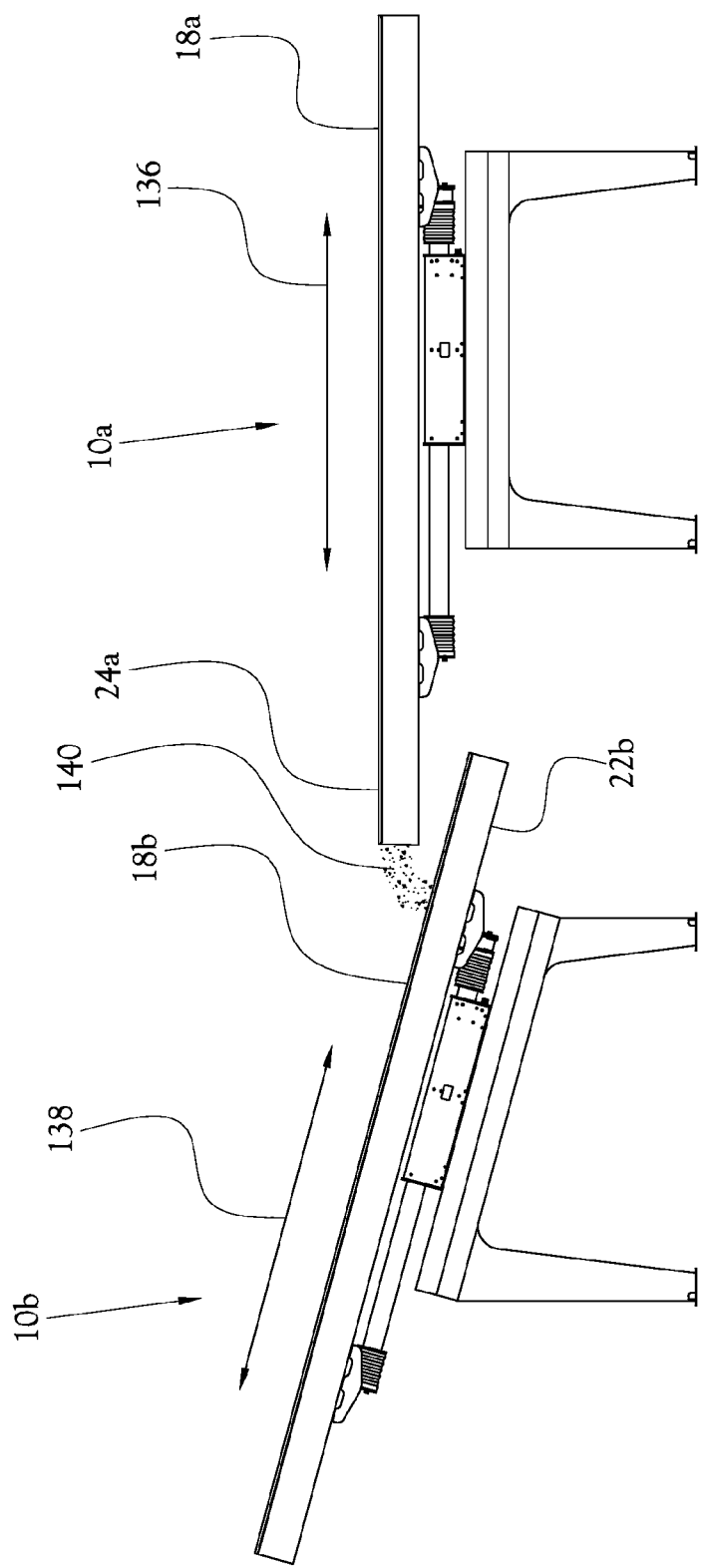
FIG. 9 is a side elevation view of showing another embodiment of a linear wave motion conveyor constructed in accordance with several features of the present general inventive concept.

In various other embodiments, the reverse motion of the pan 18 toward its leading end 22 may allow at least some slowing and/or reverse movement of the material on the first major surface 34. However, in such embodiments, the forward motion of the material along the first major surface 34 produced during and/or shortly after the forward motion of the pan 18 toward its discharge end 24 is greater than the reverse motion of the material along the first major surface 34 produced by the reverse motion of the pan 18 toward its leading end 22. Thus, over repeated cycles of movement of the pan 18, the conveyed material is ultimately progressed along the first major surface 34 toward the discharge end 24. The conveyed material can be moved at an inclined angle, and in forward and reverse directions, as illustrated in FIG. 9.

FIG. 7 illustrates one embodiment of an input module 70 constructed in accordance with several features of the present general inventive concept. In the illustrated embodiment, a plurality of command data is displayed in a series of rows and columns, with each column of command data corresponding to a specific set of motion characteristics performed during a particular phase within a single cycle of motion of the pan 18, and each row corresponding to a particular type of motion characteristic for the given phase. For example, in the illustrated embodiment, a staging phase of motion of the pan 18 is provided and begins with the motion characteristics set forth in the first column of command data, identified as "Phase 0." More specifically, the staging phase of motion begins with the pan 18 being moved according to a first speed 74. Such movement of the pan 18 is limited to movement within a first maximum acceleration 76 and a first maximum deceleration 78, and is applied over a first distance 80. The pan 18 is then moved according to a cycle of motion as set forth in the second through sixth columns of command data, identified as "Phase 1" through "Phase 5." For example, following the staging phase, the pan 18 is moved according to the motion characteristics set forth in the second column of command data, identified as "Phase 1," and more specifically, according to a second speed 82, within a second maximum acceleration 84 and/or deceleration 86, and a second distance 88. The pan 18 is then moved according to the motion characteristics set forth in the third column of command data, identified as "Phase 2," and more specifically, according to a third speed 90, a third maximum acceleration 92 and/or deceleration 94, and a third distance 96. The pan 18 is then moved according to the motion characteristics set forth in the fourth column of command data, identified as "Phase 3," and more specifically, according to a fourth speed 98, a fourth maximum acceleration 100 and/or deceleration 102, and a fourth distance 104. The pan 18 is then moved according to the motion characteristics set forth in the fifth column of command data, identified as "Phase 4," and more specifically, according to a fifth speed 106, a fifth maximum acceleration 108 and/or deceleration 110, and a fifth distance 112. Finally, at the conclusion of the cycle of motion, the pan 18 is moved according to the motion characteristics set forth in the sixth column of command data, identified as "Phase 5," and more specifically, according to a sixth speed 114, a sixth maximum acceleration 116 and/or deceleration 118, and a sixth distance 120. Following movement of the pan as set forth in the sixth column ("Phase 5"), the pan 18 repeats the cycle of motion, beginning with movement of the pan as set forth in the second column ("Phase 1").

In various embodiments, each of the above-discussed plurality of command data can be programmable by a user, such that any of a wide variety of desired cyclic pattern of forward and backward motion of the pan 18 in relation to the base 20 may be established. For the sake of convenience, in the illustrated embodiment of FIG. 7, each of the datum values for the plurality of command data displayed in the above-discussed series of rows and columns is illustrated as "0." However, it will be recognized that each of these datum values may be set to any numerical value which provides the above-discussed desirable motion characteristics for the particular phase of motion. In the illustrated embodiment, a plurality of controls 124 are provided along the input module 70 to enable such programmability. However, it will be recognized that other suitable devices and configurations exist which are suitable to provide the above-discussed programmability of the input module 70. In several embodiments, each single cycle of motion can conclude with the pan returning to its original starting position. For example, in several embodiments, the input module 70 includes suitable programming logic and internal commands such that the final column of command data is automatically set to values which will result in the pan 18 returning to its original starting position. In other embodiments, the input module 70 is configured such that the first three columns of command data refer to movement of the pan 18 in the forward direction, while the last three columns of command data refer to movement of the pan 18 in the backward direction. In still other embodiments, each column of command data, and hence each phase of motion throughout a single cycle of motion of the pan 18, can be performed independently of the remaining columns. It will further be understood that the quantity and organization of command data points of the command module 70 may vary without departing from the spirit and scope of the present general inventive concept. Thus, in various embodiments, the input module 70 may provide greater or fewer numbers and types of programmable command data, and in various embodiments, such programmable command data may or may not be displayed in the above-discussed columnar layout.

In several embodiments, the input module 70 can be configured with command data conforming to multiple cycles of motion of the pan 18, such that the controller 64 directs the linear drive mechanism 12 to perform each of the different programmed cycles of motion in sequence. The input module 70 may be connected to the linear drive mechanism via a wired or wireless connection. In the illustrated embodiment, a "stroke" value 122 is provided be generated by the controller with a series of sequential positive integers. Each integer "stroke" value 122 can correspond to a different set of command data programmed into the input module 70, and each set of command data sets forth characteristics of a single cycle of motion of the pan 18. The controller 64 can be configured to perform each set of programmed command data in sequence as set forth by the "stroke" value, and to repeat this sequence, thus establishing a more complex cyclic motion of the pan 18 in relation to the base 20. For example, in some embodiments, the input module 70 may be programmed in such a way that the cyclic motion of the pan 18 urges product toward the leading end 22 of the pan 18, rather than the discharge end 24, thereby effectively reversing the flow of material along the pan 18. In other embodiments, the particular sequence of sets of programmed command data may be designated by a user.

Figure 8:
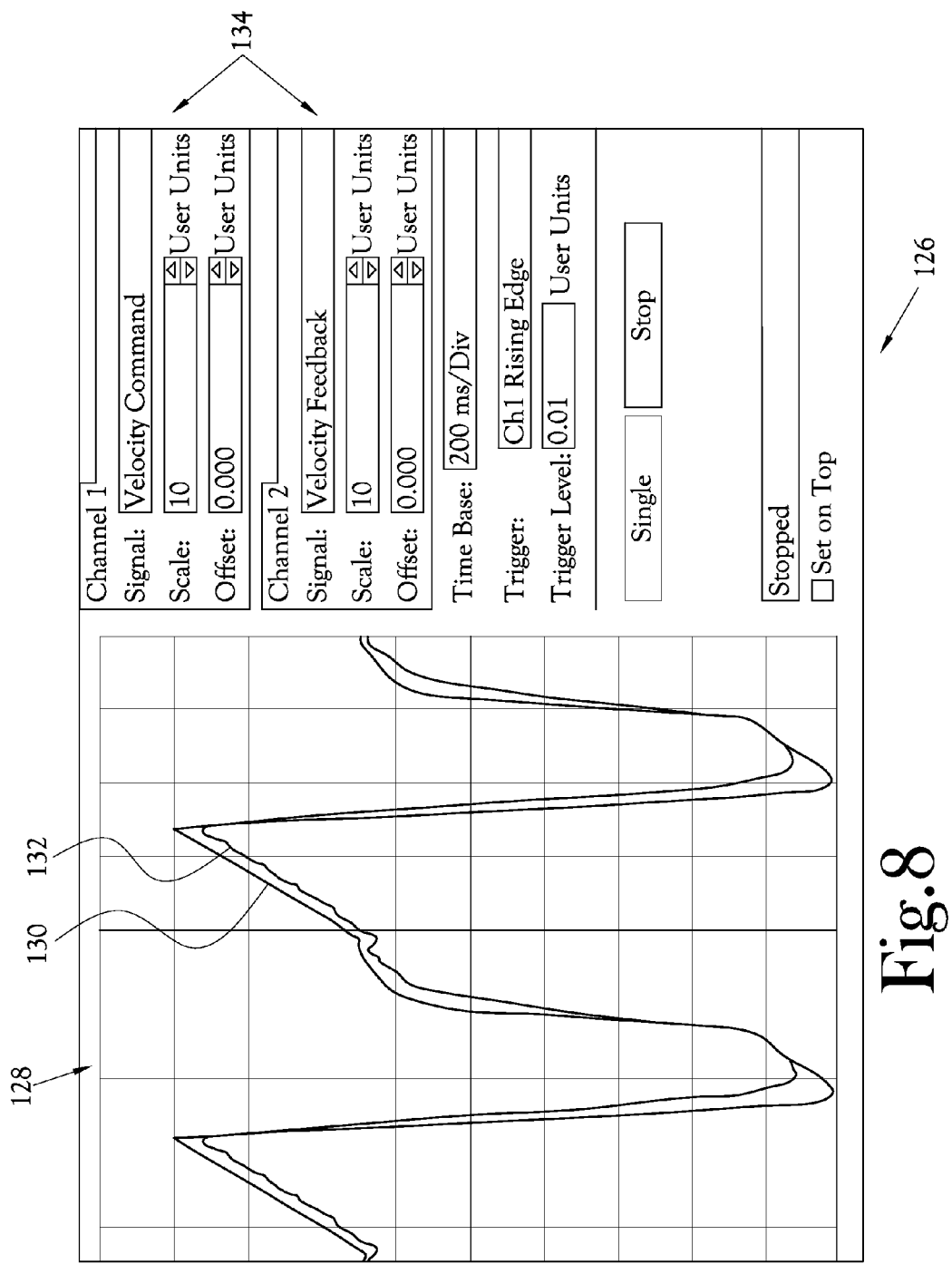
FIG. 8 is a depiction of one embodiment of a display device for a linear wave motion conveyor constructed in accordance with several features of the present general inventive concept.

In various embodiments, a display device 126 is provided in operative communication with the sensors 66 and the input module 70 to allow a user to monitor the desired cyclic motion of the pan 18, as determined by the programmed command data, versus the actual motion of the pan 18 as indicated by the sensors 66. One such display device is illustrated in FIG. 8, which illustrates an example wave motion of the device generated by inputs to the input module 70. In the embodiment of FIG. 8, the display device 126 includes a graphical display 128 which includes graphical representations of both the desired velocity of the pan 18 over time 130, as determined by the programmed command data, as well as the actual velocity of the pan 18 over time 132, as indicated by the sensors 66. Additionally, the display device 126 includes display portions 134 indicating the particular data displayed on the graphical display 128. In the illustrated embodiment, the display portions 134 include a plurality of fillable text boxes which may be adjusted via suitable controls to allow the graphical display 128 to show various types of data relating to motion of the pan 18, such as for example velocity, acceleration, position, etc. In the illustrated embodiment, the display portions 134 further include adjustable fillable text boxes indicating the scale of the graphical display 128, offset of the graphical representations, time base, trigger, and trigger level. Each of the above-discussed features may assist a user in monitoring the performance of the conveyor 10, as well as allow a user to adjust and/or reprogram the command data of the input module 70 to achieve a more desirable cyclic motion of the pan 18.

It will be recognized that the specific velocities of the pan 18 in the forward and reverse directions necessary to convey material along the first major surface 34 of the pan 18 may vary depending upon the specific characteristics of the pan 18 employed in the conveyor 10, as well as the specific characteristics of the material to be conveyed. For example, in an embodiment in which the pan 18 includes a first major surface 34 having a relatively high coefficient of friction, a relatively higher acceleration of the pan 18 in the reverse direction may be necessary in order to allow the pan 18 to slip beneath the conveyed material while returning toward the leading end 22. Furthermore, in such an embodiment, a relatively higher acceleration of the pan 18 in the forward direction may be employed to urge the conveyed material along the first major surface 34 toward the discharge end 24. Conversely, in an embodiment in which the pan 18 includes a first major surface 34 having a relatively low coefficient of friction, a relatively lower acceleration of the pan 18 in the reverse direction may be employed while still allowing the pan 18 to slip beneath the conveyed material while returning toward the leading end 22. However, in such an embodiment, a relatively lower acceleration of the pan 18 in the forward direction may be necessary in order to frictionally engage the conveyed material. Likewise, the relative velocities at which material to be conveyed along the first major surface 34 is frictionally engaged by the first major surface 34, or at which the first major surface 34 slips beneath the material to be conveyed, may depend upon the weight, coefficient of friction, or other such characteristics of the material to be conveyed.

It will further be recognized that the specific velocities of the pan 18 in the forward and reverse directions necessary to convey material along the first major surface 34 of the pan 18 may also vary depending upon the inclination of the pan 18 to a horizontal plane. For example, in the embodiment of FIG. 9, a first conveyor 10a is provided in which an elongated dimension 136 of the pan 18a is oriented substantially parallel to the horizontal. The discharge end 24a of the pan 18a empties the conveyed bulk materials 140 onto a leading end 22b of a second conveyor 10b. The elongated dimension 138 of the pan 18b of the second conveyor 10b is oriented at a substantial incline to the horizontal. Thus, it will be understood that, while the second conveyor 10b is capable of conveying bulk materials 140 along the inclined elongated dimension 138 of the pan 18b, increased acceleration of the pan 18b is required as compared to the more horizontally-oriented first conveyor pan 18a.

It will further be recognized that the above-discussed cyclic motion of the pan 18 tends to encourage relatively even distribution of a stream of conveyed bulk materials along the first major surface 34 as such bulk materials are conveyed along the length of the pan 18. In several embodiments, the discharge end 24 of the conveyor 10 defines a relatively straight edge extending substantially perpendicular to the elongated dimension of the pan 18. Thus, with reference to FIG. 3, as a stream of bulk materials are conveyed along the pan 18, the bulk materials are discharged from the discharge end 24 of the conveyor 10 in a relatively even distribution across a width 72 of the discharge end 24. In such embodiments, the discharged materials may be received along a surface, such as for example another conveyor, and/or may be allowed to fall into an elongated pile extending beneath, and along, the width 72 of the discharge end 24. Thus, it will be understood that, in embodiments in which the discharge end 24 defines a straight edge perpendicular to the elongated dimension of the pan 18, in order to maintain the discharged bulk materials in an even distribution over a width defined by the width 72 of the discharge end 24, such materials must be received from the discharge end 24 along a surface and carried in a direction generally parallel to the elongated dimension of the pan 18.

Figure 10:
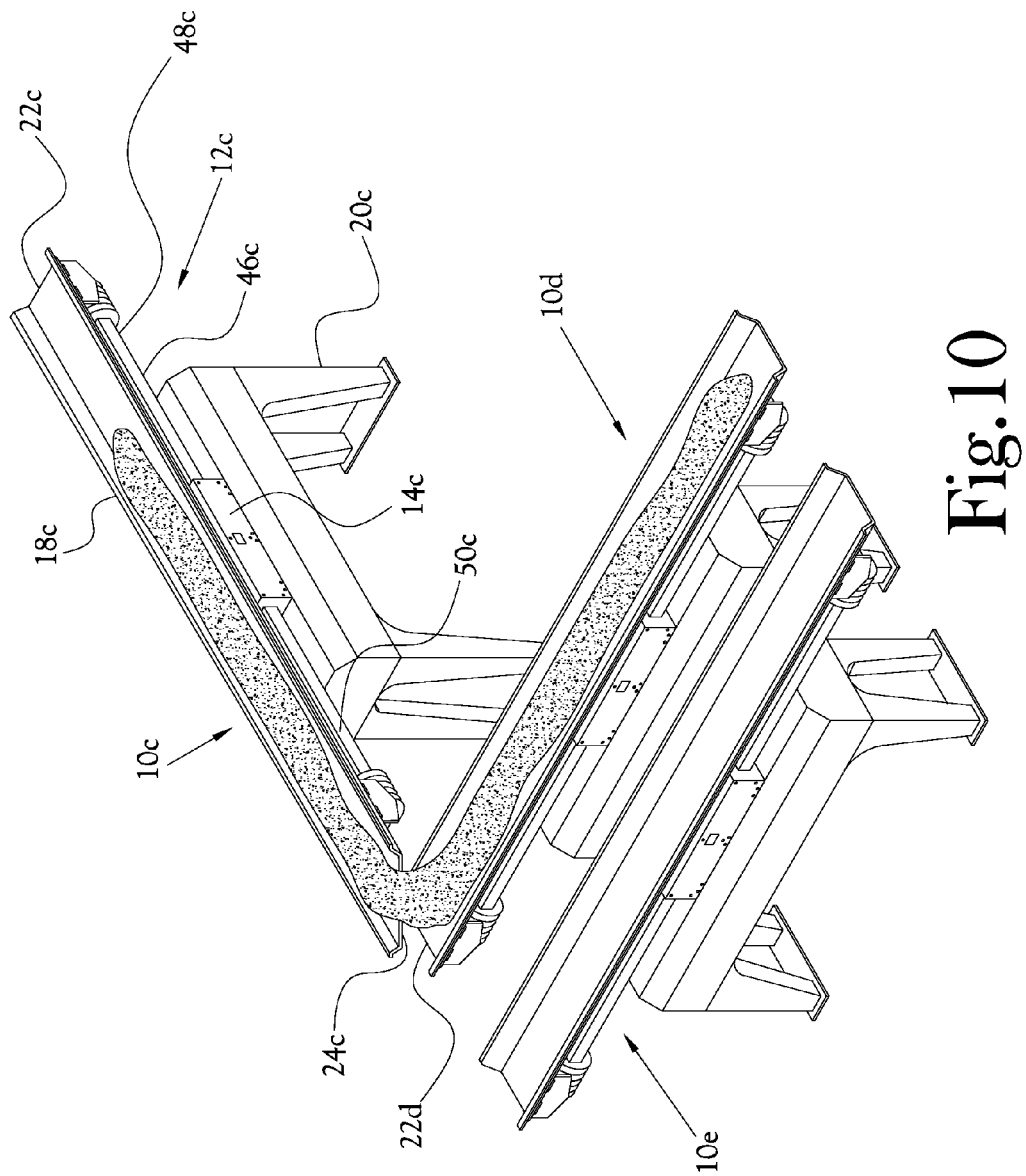
FIG. 10 is a perspective view of showing another embodiment of a linear wave motion conveyor constructed in accordance with several features of the present general inventive concept.
Figure 11:
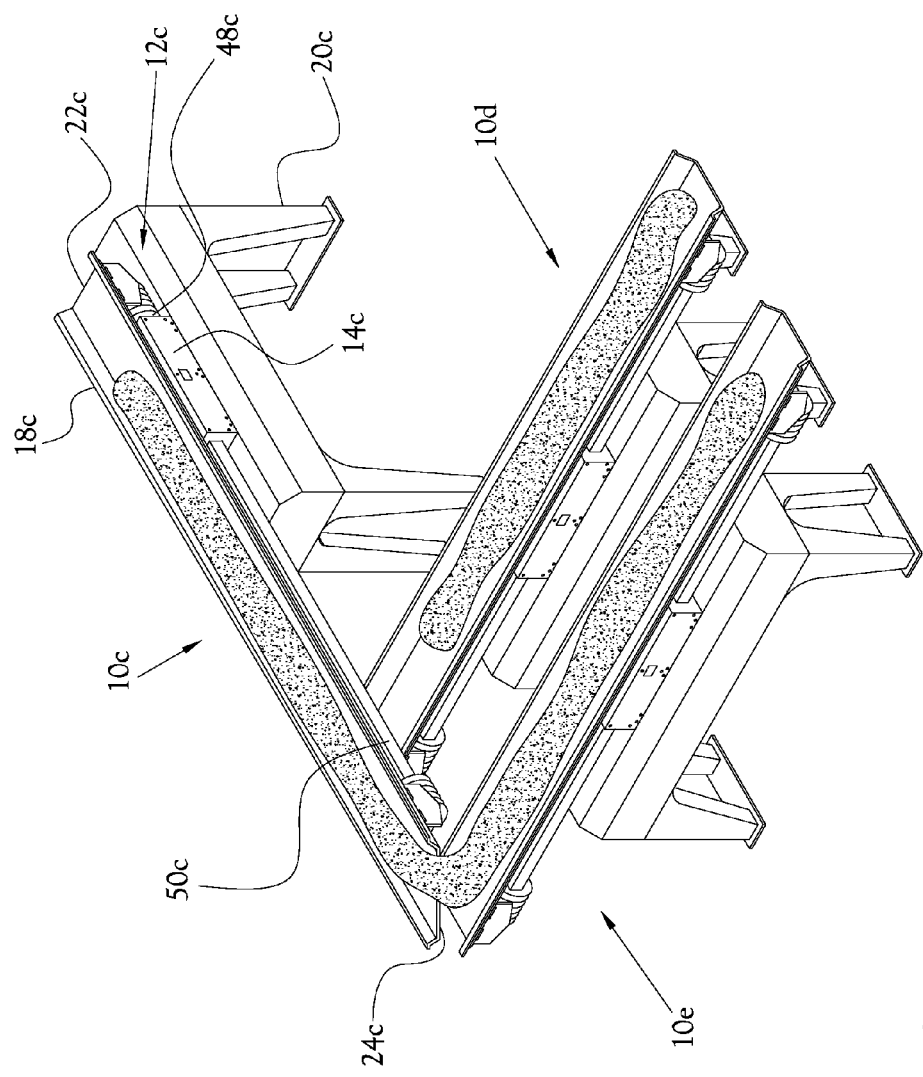
FIG. 11 is a perspective view of the linear wave motion conveyor of FIG. 10.

In other embodiments, the discharge end 24 of the conveyor 10 optionally defines a shape which is suitable to allow bulk materials discharged from the discharge end 24 to be spread along a surface for movement in a direction non-parallel to the elongated dimension of the pan 18. For example, in the embodiment of FIGS. 10 and 11, the discharge end 24c of a first conveyor 10c defines a relatively straight edge extending at a bias to the length and width of the pan 18c. In this embodiment, as a stream of bulk materials are conveyed along the pan 18c, the bulk materials are discharged in a relatively even distribution across the biased length of the discharge end 24c. Thus, as shown in FIG. 10, a linear receiving surface, such as for example a second conveyor 10d, may be positioned to span beneath the biased discharge end 24c of the conveyor 10c and to extend in a direction non-parallel to the elongated dimension of the pan 18c. In this configuration, bulk materials discharged from the discharge end 24c are spread across the width of the leading end 22d spanning beneath the discharge end 24c of the first conveyor 10c.

It will be recognized that the above-discussed bias of the discharge end 24c is not essential to accomplishment of a conveyor 10 in accordance with the present general inventive concept, and that other means for accomplishing discharge of bulk materials the discharge end 24 to be spread along a surface for movement in a direction non-parallel to the elongated dimension of the pan 18 may be provided. For example, in some embodiments, the above-discussed cycle of motion provided by the linear drive mechanism 12 allows for slight movement of the discharge end 24 along the thrust bar 46, such that bulk materials discharged from the discharge end 24 may be spread along a width of an adjacent conveyor.

Referring again to FIGS. 10 and 11, in the illustrated embodiment, the range of motion of the pan 18c in relation to the base 20c provided by the linear drive mechanism 12c is sufficiently great as to allow the discharge end 24c of the conveyor 10 to be effectively repositionable along the length of the thrust bar 46c throughout the range of motion of the pan 18c. For example, in several embodiments, the overall length of the thrust bar 46c is significantly greater than the overall length of the stator portion 14c, such that the combined length of the portions of the thrust bar protruding from the stator portion 14c significantly exceeds the length of thrust bar necessary to perform the above-discussed cyclic motion of the pan 18c. Thus, in several embodiments, the positioning of the stator portion 14c along the length of the thrust bar 46c, and hence the position of the pan 18c in relation to the base 20c, may be adjusted between a first position (FIG. 10), in which the stator portion 14c is situated relatively close to the second end 50c of the thrust bar 46c with the discharge end 24c of the pan 18c relatively close to the base 20c, and a second position (FIG. 11), in which the stator portion 14c is situated relatively close to the first end 48c of the thrust bar 46c with the leading end 22c of the pan 18 relatively close to the base 20c. In such embodiments, the stator portion 14c is capable of performing the above-discussed cyclic motion of the pan 18c such that material may be discharged from the discharge end 24c of the conveyor 10c at either the first or second positions. Thus, the conveyor 10c may be configured to discharge material alternately onto two or more receiving surfaces, such as the second conveyor 10d or the third conveyor 10e.

Figure 12:
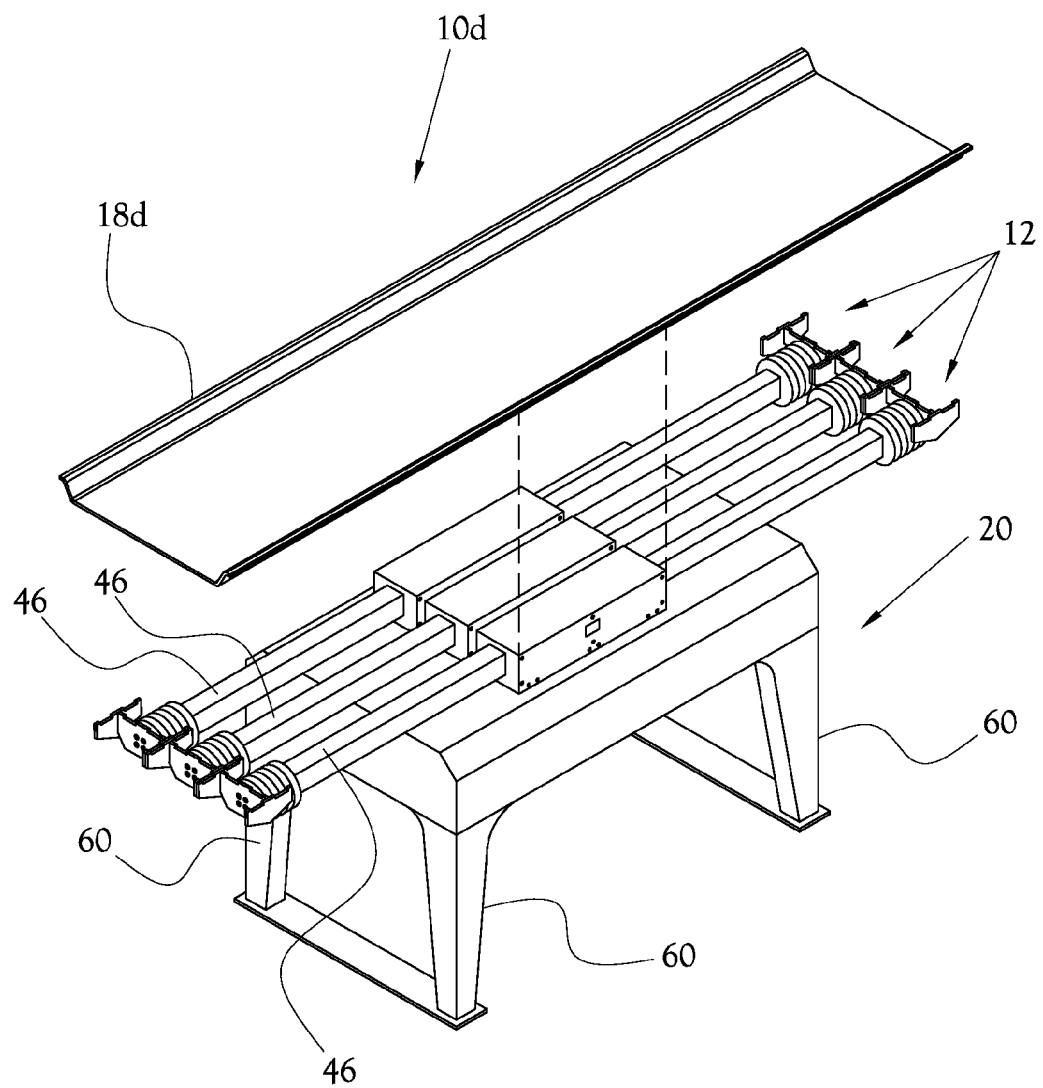
FIG. 12 is a partially-exploded perspective view showing another embodiment of a linear wave motion conveyor constructed in accordance with several features of the present general inventive concept.

It will be recognized that the present general inventive concept is not limited to embodiments in which only a single linear drive mechanism 12 is provided for each pan 18. Rather, in various embodiments, two or more linear drive mechanisms 12 may be provided to cooperatively drive the pan 18. For example, in the embodiment of FIG. 12, a conveyor 10d is provided which includes a pan 18d having an increased width dimension, as compared to previous embodiments. In the embodiment of FIG. 12, a plurality of linear drive mechanisms 12 are provided in side-by-side relationship, with each thrust arm 46 of each linear drive mechanism 12 being secured to the pan 18d and extending parallel to a conveying direction of the pan 18d. Each stator portion 14 of each linear drive mechanism 12 is secured to the base 20, and the controller (not shown) is configured for operative communication with each of the stator portions 14. In this configuration, the linear drive mechanisms 12 cooperate to support the weight of the pan 18d and to drive the pan 18d in forward and backward directions along the conveying direction.

Figure 13:
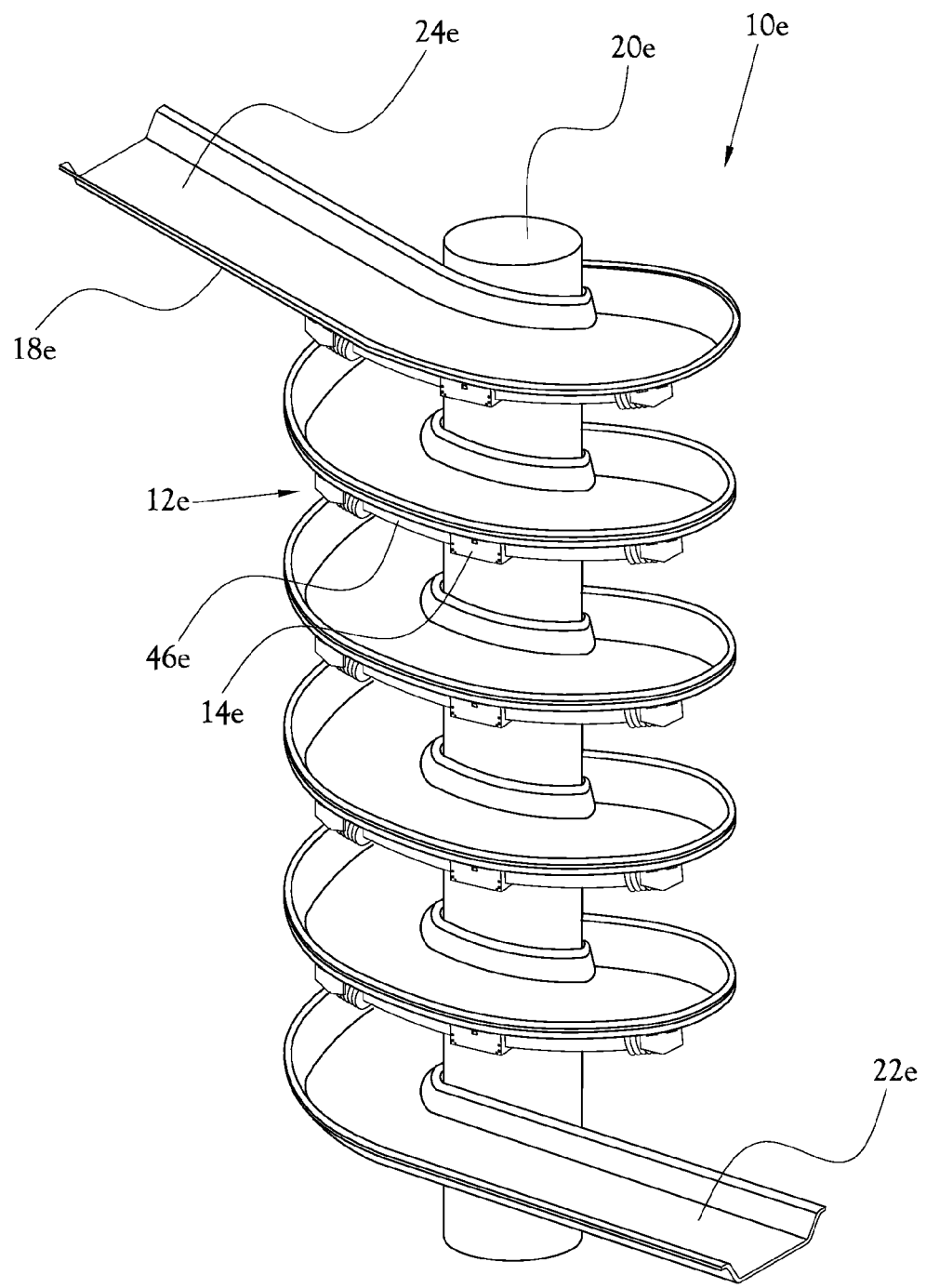
FIG. 13 is a perspective view showing another embodiment of a linear wave motion conveyor constructed in accordance with several features of the present general inventive concept.

It will be recognized that the above-discussed plurality of linear drive mechanisms 12 may embody other arrangements and configurations without departing from the spirit and scope of the present general inventive concept. For example, in other embodiments, a plurality of linear drive mechanisms 12 may be provided in an end-to-end linear configuration along a pan 18. Thus, it will be recognized that the present general inventive concept may be achieved by providing a pan 18 defining any of a variety of shapes, lengths, widths, and configurations. It will further be recognized that the pan 18 may embody shapes that provide for non-linear conveyance of bulk materials without departing from the spirit and scope of the present invention. For example, FIG. 13 illustrates another embodiment of a conveyor 10e. In the embodiment of FIG. 13, a pan 18e is provided having an elongated dimension extending in a spiral shape about a central vertical support 20e. A plurality of linear drive mechanisms 12e are provided, with each linear drive mechanism 12e having a thrust bar 46e defining a substantially arced shape generally conforming to the spiral shape of the elongated dimension of the pan 18e. Each thrust bar 46e is secured along the underside of the pan 18e along the spiral elongated dimension, and a stator portion 14e of each linear drive mechanism 12e is secured via suitable linkages to the central vertical support 20e. In this embodiment, a controller is provided for operative communication with each of the stator portions 14e, such that the linear drive mechanisms 12e may be run in unison in order to effect rotation of the pan 18e about the central vertical support 20e in clockwise and counter-clockwise directions.

In the illustrated embodiment, the pan 18e is configured such that a leading end 22e of the pan 18e extends from a lower end of the spiral shape, while a discharge end 24e of the pan 18e extends from an upper end of the spiral shape. In this embodiment, the conveyor 10e is configured for cyclic rotational motion so as to urge bulk materials upward along the spiral-shaped pan 18e. Thus, it will be recognized that the conveyor 10e may be used to convey materials from a lower elevation proximate the leading end 22e to a higher elevation proximate the discharge end 24e. In other embodiments, the leading end 22e and discharge end 24e may be reversed, such that they conveyor is configured to convey materials from a higher elevation to a lower elevation along the spiral-shaped pan 18e.

It is noted that the simplified diagrams and drawings do not illustrate all the various connections and assemblies of the various components. For example, it will be recognized that additional linkages, linear bearings, or the like, may be provided to establish additional support between the pan 18 and the base 20, or between the pan 18 and the linear drive mechanism 12. Furthermore, it will be recognized that additional features, such as for example counterweights to coordinate motion and to counteract accelerations applied by one or more of the linear drive mechanisms 12, may be included in the conveyor 10 without departing from the spirit and scope of the present general inventive concept. Those skilled in the art will understand how to implement such connections and assemblies, based on the illustrated components, figures, and descriptions provided herein, using sound engineering judgment. Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

What is claimed is:

1. A linear wave motion conveyor comprising:
   a pan defining a conveying surface, a leading end, an opposite discharge end, and a conveying direction extending from said leading end to said discharge end;
   a linear drive mechanism having an elongated thrust bar extending parallel to said conveying direction and a stator portion configured to drive said thrust bar in relation to said stator portion along said conveying direction, said pan being fixed in relation to one of said thrust bar or said stator portion; and
   a controller in operative communication with said stator portion to control driving of said thrust bar in relation to said stator portion, said controller being configured to cause said stator to drive said thrust bar in conformity with a cyclic pattern of motion along said conveying direction,
   wherein said thrust bar is sufficiently long to allow said stator portion to drive said thrust bar in conformance with said cyclic pattern of motion along separate upstream and downstream portions of said thrust bar, thereby allowing said discharge end of said pan to be repositionable among at least one discharge location.

2. The linear wave motion conveyor of claim 1, said thrust bar being fixed to said pan and said stator portion being fixed to a base, said base carrying and supporting said pan and linear drive mechanism.

3. The linear wave motion conveyor of claim 2, said thrust bar carrying and supporting said pan.

4. The linear wave motion conveyor of claim 3, said stator portion comprising a linear motor which is configured to apply electromagnetic induction forces to the thrust bar.

5. The linear wave motion conveyor of claim 1, said controller comprising:
   at least one sensor configured to sense a positional or movement characteristic of said thrust bar in relation to said stator portion;
   an input module configured to generate a plurality of command data relating to a desired cyclic pattern of motion; and
   a command module in communication with said sensor and said input module, said command module configured to receive an indication of said characteristic sensed by said sensor, to compare said characteristic with said command data, and to issue an output command to said stator portion to drive said thrust bar in substantial conformity with said command data.

6. The linear wave motion conveyor of claim 5 further comprising a display device configured to display at least one of a graphical representation of a desired cyclic motion of said pan and a graphical representation of an actual motion of the pan.

7. The linear wave motion conveyor of claim 6, said plurality of command data comprising a plurality of phases, each phase relating to a portion of a single cycle of said cyclic pattern of motion.

8. The linear wave motion conveyor of claim 7, each phase of command data comprising:
   a speed datum corresponding to a desired speed of said thrust bar during said phase;
   a maximum acceleration datum corresponding to a maximum allowable acceleration of said thrust bar during said phase;
   a maximum deceleration datum corresponding to a maximum allowable deceleration of said thrust bar during said phase; and
   a distance datum corresponding to a length of said thrust bar over which said phase is applied;
   whereby a duration of each said phase is governed at least in part by said speed datum and said distance datum.

9. The linear wave motion conveyor of claim 8, said command module configured to command said stator portion according to a sequential progression of each of said phases of command data.

10. The linear wave motion conveyor of claim 9, said input module being programmable with a plurality of command data relating to a plurality of cycles of motion.

11. The linear wave motion conveyor of claim 10, said command module configured to command said stator portion according to a sequential progression of each of said plurality of cycles of motion.

12. The linear wave motion conveyor of claim 1 further comprising a plurality of a linear drive mechanisms, each linear drive mechanism having an elongated thrust bar and a stator portion configured to drive said thrust bar in relation to said stator portion along said conveying direction, each thrust bar being fixed in relation to said pan and extending parallel to said conveying direction.

13. The linear wave motion convey or of claim 12, each of said plurality of linear drive mechanisms being arranged in side-by-side configuration parallel to said conveying direction of said pan.

14. The linear wave motion conveyor of claim 12, each of said plurality of linear drive mechanisms being arranged in end-to-end configuration along said conveying direction of said pan.

15. The linear wave motion conveyor of claim 14, wherein said pan defines a spiral shape along said conveying direction.

16. The linear wave motion conveyor of claim 12 wherein said controller comprises:
at least one sensor configured to sense a positional or movement characteristic of at least one thrust bar in relation to said corresponding stator portion;
an input module configured to generate a plurality of command data relating to a desired cyclic pattern of motion; and
a command module in communication with said sensor and said input module, said command module configured to receive an indication of said characteristic sensed by said sensor, to compare said characteristic with said command data, and to issue an output command to each said stator portion to drive said corresponding thrust bar in substantial conformity with said command data.

17. A method of moving goods with a linear wave motion conveyor, said method comprising:
providing a conveyor having an elongated pan carried and driven along an elongated dimension of the pan by a linear motor, at least one sensor configured to sense at least one characteristic of the pan, the characteristic being selected from the group consisting of position, speed, and acceleration, a command module in communication with the sensor, and an input module in communication with the command module;
programming a plurality of command data relating to a desired cyclic pattern of motion of the pan into the input module;
conveying sensory data from the sensor to the command module and command data from the input module to the command module; and
producing an output command to selectively actuate the linear motor in substantial conformity with the command data;
wherein the plurality of command data comprises a plurality of phases, each phase relating to a portion of a single cycle of the desired cyclic pattern of motion; and
each phase of command data comprising:
a speed datum corresponding to a desired speed of the pan,
a maximum acceleration datum corresponding to a maximum allowable acceleration of the pan,
a maximum deceleration datum corresponding to a maximum allowable deceleration of the pan, and
a distance datum corresponding to a distance over which the phase is applied,
whereby a duration of each phase is governed at least in part by the speed datum and the distance datum.

18. The method of claim 17 wherein each phase of command data further comprises a maximum rate of change of acceleration and a maximum rate of change of deceleration of the pan.

19. The method of claim 18 wherein the output signal comprises a series of commands to selectively actuate the linear motor according to a sequential progression of each of the phases of command data.

20. The method of claim 19 wherein the programming operation includes programming a plurality of command data relating to a plurality of cycles of motion into the input module.

21. The method of claim 20 wherein the output signal comprises a series of commands to selectively actuate the linear motor according to a sequential progression of each of said plurality of cycles of motion.

22. The method of claim 17, said providing operation further comprising providing a plurality of conveyors, each conveyor having an elongated pan carried and driven along an elongated dimension of the pan by a linear motor, wherein the output command is configured to selectively actuate each of the linear motors in substantial conformity with the command data.

23. A linear wave motion conveyor comprising:
a pan defining a conveying surface, a leading end, an opposite discharge end, and a conveying direction extending from said leading end to said discharge end;
a linear drive mechanism having an elongated thrust bar extending parallel to said conveying direction and a stator portion configured to drive said thrust bar in relation to said stator portion along said conveying direction, said pan being fixed in relation to one of said thrust bar or said stator portion;
a base configured to support said pan, said thrust bar, and said stator portion such that said one of said thrust bar or said stator portion that is not fixed to said pan is fixed to said base without said pan being otherwise coupled to said base; and
a controller in operative communication with said stator portion to control driving of said thrust bar in relation to said stator portion, said controller being configured to cause stator portion to drive said thrust bar in conformity with a cyclic pattern of motion along said conveying direction,
wherein said thrust bar is sufficiently long to allow said stator portion to drive said thrust bar in conformance with said cyclic pattern of motion along separate upstream and downstream portions of said thrust bar, thereby allowing said discharge end of said pan to be repositionable among a plurality of discharge locations.

24. A linear wave motion conveyor comprising:
a pan defining a conveying surface, a leading end, an opposite discharge end, and a conveying direction extending from said leading end to said discharge end;
a linear drive mechanism having an elongated thrust bar extending parallel to said conveying direction and a stator portion configured to drive said thrust bar in relation to said stator portion along said conveying direction, said pan being fixed in relation to one of said thrust bar or said stator portion; and
a controller in operative communication with said stator portion to control driving of said thrust bar in relation to said stator portion, said controller being configured to receive customizable command data to control said stator portion to drive said thrust bar according to selected movement characteristics corresponding to a plurality of phases along said conveying direction,
wherein a plurality of different movement distances are selectable for said thrust bar such that said discharge end is selectively controlled to discharge at a plurality of discharge locations according to the selected movement characteristics.

* * * * *